United States Patent
Fukushiro et al.

(10) Patent No.: US 7,637,833 B2
(45) Date of Patent: Dec. 29, 2009

(54) CONTROL APPARATUS AND CONTROL METHOD FOR AUTOMATIC TRANSMISSION

(75) Inventors: Eiji Fukushiro, Nagoya (JP); Hiromichi Kimura, Okazaki (JP); Koji Oshima, Nagoya (JP); Ayumu Sagawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 440 days.

(21) Appl. No.: 11/528,440

(22) Filed: Sep. 28, 2006

(65) Prior Publication Data
US 2007/0082785 A1 Apr. 12, 2007

(30) Foreign Application Priority Data
Oct. 7, 2005 (JP) .............................. 2005-295221

(51) Int. Cl.
*F16H 61/02* (2006.01)
(52) U.S. Cl. ........................... 475/121; 477/905; 477/98
(58) Field of Classification Search ................. 477/905; 475/117, 121
See application file for complete search history.

(56) References Cited

U.S. PATENT DOCUMENTS

| 2002/0019292 A1* | 2/2002 | Popp et al. .................. 477/156 |
| 2002/0086760 A1 | 7/2002 | Hayabuchi et al. |
| 2003/0083172 A1 | 5/2003 | Miyazaki et al. |
| 2006/0293143 A1 | 12/2006 | Cho |

FOREIGN PATENT DOCUMENTS

| DE | 100 35 479 A1 | 2/2002 |
| JP | 9-296861 A | 11/1997 |
| JP | 9-317870 A | 12/1997 |
| JP | 10-47462 | 2/1998 |
| JP | 10-299880 A | 11/1998 |
| JP | 2001-132835 | 5/2001 |
| JP | 2001-280456 A | 10/2001 |
| JP | 2002-310277 | 10/2002 |
| KR | 10-2004-0004343 A | 1/2004 |
| KR | 10-2006-0042276 A | 5/2006 |
| KR | 10-2006-0056146 A | 5/2006 |

OTHER PUBLICATIONS

Boshc: Elektronische Getriebesteurung. 1$^{st}$ edition. 2004. Plochingen. Bosch company literature (Gelbe Reihe), R3, D 96, ISBN 3-7782-2027-6, Aug. 2004, 8 Pages.

* cited by examiner

*Primary Examiner*—Sherry L Estremsky
*Assistant Examiner*—Edwin A. Young
(74) *Attorney, Agent, or Firm*—Oblon, Spivak, McClelland, Maier & Neustadt, L.L.P.

(57) ABSTRACT

An ECU executes a program including the steps of: starting disengagement of a C2 clutch and a B1 brake when downshifting a transmission implementing gears in accordance with combinations of engaged clutches and brakes from sixth gear to third gear, or disengagement of the C2 clutch and a B3 brake when downshifting from fifth gear to second gear; when at least one of the C2 clutch and the B1 brake, or at least one of the C2 clutch and the B3 brake, is completely disengaged, starting engagement of a C1 clutch and the B3 brake when downshifting from sixth gear to third gear, or engagement of the C1 clutch and the B1 brake when downshifting from fifth gear to second gear.

15 Claims, 5 Drawing Sheets

F I G. 3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGE
× DISENGAGE
◎ ENGAGE DURING ENGINE BRAKING
△ ENGAGE ONLY DURING DRIVING

CONTROL APPARATUS AND CONTROL METHOD FOR AUTOMATIC TRANSMISSION

This nonprovisional application is based on Japanese Patent Application No. 2005-295221 filed with the Japan Patent Office on Oct. 7, 2005, the entire contents of which are hereby incorporated by reference.

BACKGROUND OF THE INVENTION

1. Field of the Invention

The present invention relates to a control apparatus and a control method for an automatic transmission. In particular, the invention relates to a technique for shifting gear by setting two frictional engagement elements to a disengaged state from an engaged state, and by setting other two frictional engagement elements to an engaged state from a disengaged state.

2. Description of the Background Art

Conventionally, automatic transmissions having a gear train composed of planetary gears are known. In such automatic transmissions, gears are implemented in accordance with combinations of frictional engagement elements that are set to an engaged state among a plurality of frictional engagement elements. As automatic transmissions are manufactured with multiple gears (as the number of gears being implemented increases), the shifting pattern varies as well. Shifting may be implemented gear by gear, or it may be implemented as downshifting from sixth gear to third gear, skipping one or more gears. When shifting is implemented gear by gear, it can often be achieved just by changing one of the plurality of frictional engagement elements being engaged. On the other hand, when shifting is implemented skipping one or more gears, it may not be achieved if all the engaged frictional engagement elements are changed.

Japanese Patent Laying-Open No. 2001-132835 discloses a shift control apparatus for automatic transmissions capable of preventing retardation of shifting while minimizing shock during shifting in which two frictional engagement elements are caused to enter a disengaged state from an engaged state, and other two frictional engagement elements are caused to enter the engaged state from the disengaged state. The shift control apparatus disclosed in Japanese Patent Laying-Open No. 2001-132835 controls shifting of an automatic transmission, in which actuation of four frictional engagement elements is required for shifting from a first gear to a second gear, the first gear is achieved by engagement of first and second frictional engagement elements, and the second gear is achieved by engagement of third and fourth frictional engagement elements. The shift control apparatus includes a shift control portion in which: disengagement of the second frictional engagement element is started after disengagement of the first frictional engagement element is started; engagement of the fourth frictional engagement element is completed after engagement of the third frictional engagement element is completed; and disengagement of the second frictional engagement element is started before engagement of the third frictional engagement element is completed. The shift control portion starts engagement of the third frictional engagement element, and thereafter starts disengagement of the second frictional engagement element, and then completes engagement of the third frictional engagement element. Disengagement of the first frictional engagement element and engagement of the third frictional engagement element are simultaneously started.

According to the shift control apparatus of the publication, disengagement of the second frictional engagement element is started after disengagement of the first frictional engagement element is started; and engagement of the fourth frictional engagement element is completed after engagement of the third frictional engagement element is completed. Thus, it becomes possible to shorten the period of a shift state in which all of the four frictional engagement elements is slipping, and increase the period of a state in which one frictional engagement element is engaged. Therefore, the shifting state of the transmission mechanism is prevented from progressing disorderly due to slipping of the four frictional engagement elements. As a result, occurrence of great shock when shifting is completed can be suppressed. Further, disengagement of the second frictional engagement element is started before engagement of the third frictional engagement element is completed. Thus, shifting can be implemented without incurring a state where two frictional engagement elements are completely engaged simultaneously. This can prevent temporal stopping of the progress of shifting that invites shifting in two stages. As a result, retardation in shifting can be prevented. Still further, disengagement of the second frictional engagement element is started after engagement of the third frictional engagement element is started and before the engagement is completed (complete engagement). Thus, by the slip state just after starting disengagement of the second frictional engagement element and the slip state just before completing engagement of the third frictional engagement element, the engine can be revved. Therefore, retardation in shifting associated with the start of engagement of the third frictional engagement element can be offset.

However, in the shift control apparatus of Japanese Patent Laying-Open No. 2001-132835, since the engine is revved when the second frictional engagement element and the third frictional engagement element are in the slip state, the increase in the engine speed (the turbine speed of the torque converter) is suppressed. Therefore, the increase in the engine speed is slow. Accordingly, it may not be possible to completely offset the retardation in shifting associated with the start of engagement of the third frictional engagement element. In this case, the time required for shifting may be increased.

SUMMARY OF THE INVENTION

An object of the present invention is to provide a control apparatus and a control method for an automatic transmission that can further shorten the time required for shifting.

A control apparatus for an automatic transmission according to an aspect of the present invention is a control apparatus for an automatic transmission in which a gear of a first gear ratio is implemented when a first frictional engagement element and a second frictional engagement element are in an engaged state and a third frictional engagement element and a fourth frictional engagement element are in a disengaged state, and a gear of a second gear ratio is implemented when the first frictional engagement element and the second frictional engagement element are in the disengaged state and the third frictional engagement element and the fourth frictional engagement element are in the engaged state. The control apparatus includes an operation unit. The operation unit controls the first frictional engagement element and the second frictional engagement element so that, from a state where the gear of the first gear ratio is implemented, the first frictional engagement element and the second frictional engagement element enter the disengaged state, and the operation unit controls the third frictional engagement element and the fourth frictional engagement element so that, after at least one of the first frictional engagement element and the second frictional engagement element completely enters the disengaged state, engagement of the third frictional engagement element and the fourth frictional engagement element is started to implement the gear of the second gear ratio.

According to the present invention, from a state where the gear of the first gear ratio is implemented, the first frictional engagement element and the second frictional engagement element enter the disengaged state. After at least one of the first frictional engagement element and the second frictional engagement element completely enters the disengaged state (which is not the engaged or slipped state), engagement of the third frictional engagement element and the fourth frictional engagement element is started to implement a gear of a second gear ratio. Thus, when shifting gear from first to second gear ratio (for example, downshifting), by once entering the neutral state, shifting can be implemented while increasing the input shaft revolution number (the number of revolutions of the motive power supply). Here, since at least one of the first frictional engagement element and the second frictional engagement element completely enters the disengaged state, the increase in the input shaft revolution number is not suppressed. Thus, the input shaft revolution number can be increased quickly to the synchronous revolution number of the gear of the second gear ratio. As a result, the control apparatus for the automatic transmission that can further shorten the time required for shifting can be provided.

Preferably, a gear of a third gear ratio is implemented when the second frictional engagement element and the third frictional engagement element are in the engaged state and the first frictional engagement element and the fourth frictional engagement element are in the disengaged state. When a prescribed condition is satisfied, the operation unit controls the first frictional engagement element and the second frictional engagement element so that, from the state where the gear of the first gear ratio is implemented, the first frictional engagement element and the second frictional engagement element enter the disengaged state. When the prescribed condition is satisfied, the operation unit controls the third frictional engagement element and the fourth frictional engagement element so that, after at least one of the first frictional engagement element and the second frictional engagement element completely enters the disengaged state, engagement of the third frictional engagement element and the fourth frictional engagement element is started. When the prescribed condition is not satisfied, the operation unit controls each of the frictional engagement elements so that, after the first frictional engagement element enters the disengaged state and the third frictional engagement element enters the engaged state to implement the gear of the third gear ratio, the second frictional engagement element enters the disengaged state and the fourth frictional engagement element enters the engaged state to implement the gear of the second gear ratio.

According to the present invention, when the prescribed condition is satisfied, at least one of the first frictional engagement element and the second frictional engagement element completely enters the disengaged state to enter the neutral state, whereby the time required for shifting is further shortened. On the other hand, when the prescribed condition on which such shifting is possible is not satisfied, the gear of the first gear ratio is shifted to the gear of the third gear ratio, and thereafter the gear of the third gear ratio is shifted to the gear of the second gear ratio. Thus, when shifting through the neutral state where at least one of the first frictional engagement element and the second frictional engagement element is completely disengaged is not desirable, shifting can be implemented not through the neutral state. This can suppress an adverse effect caused by shifting through the neutral state.

Further preferably, the predetermined condition is a condition that a change rate of an accelerator opening degree is greater than a predetermined change rate.

According to the present invention, when the condition that a change rate of an accelerator opening degree is greater than a predetermined change rate, one of the first frictional engagement element and the second frictional engagement element is completely disengaged to enter the neutral state to thereby further shorten the time required for shifting. On the other hand, when a change rate of an accelerator opening degree is smaller than a predetermined change rate, before an ECU (Electronic Control Unit) determines shifting to the gear of the second gear ratio, it may determine shifting from the gear of the first gear ratio to the gear of the third gear ratio, and thereafter determine shifting from the gear of the third gear ratio to the gear of the second gear ratio. Here, if shifting to the gear of the third gear ratio is changed to shifting to the gear of the second gear ratio, multiple shifting that is complicated to control must be implemented, and smooth shifting control can hardly be achieved. In such a case, shifting from the gear of the first gear ratio to the gear of the third gear ratio is implemented, and thereafter shifting from the gear of the third gear ratio to the gear of the second gear ratio is implemented. Thus, the multiple shifting that is complicated to control is avoided to achieve smooth shifting.

Further preferably, each of the frictional engagement elements is actuated by a pressure of oil supplied to the automatic transmission. The predetermined condition is a condition that a temperature of the oil is higher than a predetermined temperature.

According to the present invention, when the condition that a temperature of the oil supplied to the automatic transmission for actuating each of the frictional engagement elements is higher than a predetermined temperature is satisfied, one of the first frictional engagement element and the second frictional engagement element is completely disengaged to enter the neutral state to thereby further shorten the time required for shifting. On the other hand, when the temperature of the oil is lower than a predetermined temperature, responsiveness of frictional engagement elements is low since the viscosity of oil is high. In such a case, if the automatic transmission is set to the neutral state during shifting, engagement of the third frictional engagement element and the fourth frictional engagement element may be retarded, whereby an input shaft revolution number of the automatic transmission (revolution number of the motive power source) increases more than necessary. Therefore, when the condition that a temperature of the oil is higher than a predetermined temperature is not satisfied, shifting from the gear of the first gear ratio to the gear of the third gear ratio is implemented, and thereafter shifting from the gear of the third gear ratio to the gear of the second gear ratio is implemented. Thus, shifting can be achieved without the automatic transmission entering the neutral state. This can retard engagement of the third frictional engagement element and the fourth frictional engagement element, whereby the input shaft revolution number of the automatic transmission can be suppressed from increasing more than necessary. Accordingly, shock in engagement of the third frictional engagement element and the fourth frictional engagement element can be suppressed.

Further preferably, the automatic transmission is coupled to an internal combustion engine. The predetermined condition is a condition that a temperature of a coolant of the internal combustion engine is higher than a predetermined temperature.

According to the present invention, when the condition that a temperature of a coolant of the internal combustion engine is higher than a predetermined temperature is satisfied, one of the first frictional engagement element and the second frictional engagement element is completely disengaged to enter the neutral state to thereby further shorten the time required for shifting. On the other hand, when the temperature of a coolant of the internal combustion engine is lower than a predetermined temperature, warm-up of the internal combustion engine or the catalyst may not yet be completed. In such a case, warm-up control of the internal combustion engine or the catalyst may be performed by retarding the ignition timing in the internal combustion engine. In such a state, if the engine speed is sharply increased by setting the automatic transmission to the neutral state during shifting, control of retarding the ignition timing may hardly be executed in high precision as the engine speed is hardly stabilized. Accordingly, when the condition that the temperature of a coolant of the internal combustion engine is higher than a predetermined temperature is not satisfied, shifting from the gear of the first gear ratio to the gear of the third gear ratio is implemented, and thereafter shifting from the gear of the third gear ratio to the gear of the second gear ratio is implemented. Thus, shifting can be implemented without the automatic transmission entering the neutral state. Accordingly, deterioration in the precision of the ignition timing can be suppressed.

A control method for an automatic transmission according to another aspect of the present invention is a control method for an automatic transmission in which a gear of a first gear ratio is implemented when a first frictional engagement element and a second frictional engagement element are in an engaged state and a third frictional engagement element and a fourth frictional engagement element are in a disengaged state, and a gear of a second gear ratio is implemented when the first frictional engagement element and the second frictional engagement element are in the disengaged state and the third frictional engagement element and the fourth frictional engagement element are in the engaged state. The control method for an automatic transmission includes the steps of: controlling the first frictional engagement element and the second frictional engagement element so that, from a state where the gear of the first gear ratio is implemented, the first frictional engagement element and the second frictional engagement element enter the disengaged state, and controlling the third frictional engagement element and the fourth frictional engagement element so that, after at least one of the first frictional engagement element and the second frictional engagement element completely enters the disengaged state, engagement of the third frictional engagement element and the fourth frictional engagement element is started to implement the gear of the second gear ratio.

According to the present invention, from a state where the gear of the first gear ratio is implemented, the first frictional engagement element and the second frictional engagement element enter the disengaged state. After at least one of the first frictional engagement element and the second frictional engagement element completely enters the disengaged state (which is not the engaged or slipped state), engagement of the third frictional engagement element and the fourth frictional engagement element is started to implement a gear of a second gear ratio. Thus, when shifting gear from first to second gear ratio (for example, downshifting), by once entering the neutral state, shifting can be implemented while increasing the input shaft revolution number (the number of revolutions of the motive power supply). Here, since at least one of the first frictional engagement element and the second frictional engagement element completely enters the disengaged state, the increase in the input shaft revolution number is not suppressed. Thus, the input shaft revolution number can be increased quickly to the synchronous revolution number of the gear of the second gear ratio. As a result, the control apparatus for the automatic transmission that can further shorten the time required for shifting can be provided.

Preferably, a gear of a third gear ratio is implemented when the second frictional engagement element and the third frictional engagement element are in the engaged state and the first frictional engagement element and the fourth frictional engagement element are in the disengaged state. The step of: controlling the first frictional engagement element and the second frictional engagement element so that, from a state where the gear of the first gear ratio is implemented, the first frictional engagement element and the second frictional engagement element enter the disengaged state, includes the step of: when a prescribed condition is satisfied, controlling the first frictional engagement element and the second frictional engagement element so that, from the state where the gear of the first gear ratio is implemented, the first frictional engagement element and the second frictional engagement element enter the disengaged state. The step of: controlling the third frictional engagement element and the fourth frictional engagement element so that, after at least one of the first frictional engagement element and the second frictional engagement element completely enters the disengaged state, engagement of the third frictional engagement element and the fourth frictional engagement element is started to implement the gear of the second gear ratio, includes the step of: when the prescribed condition is satisfied, controlling the third frictional engagement element and the fourth frictional engagement element so that, after at least one of the first frictional engagement element and the second frictional engagement element completely enters the disengaged state, engagement of the third frictional engagement element and the fourth frictional engagement element is started. The control method further includes the step of, when the prescribed condition is not satisfied, controlling each of the frictional engagement elements so that, after the first frictional engagement element enters the disengaged state and the third frictional engagement element enters the engaged state to implement the gear of the third gear ratio, the second frictional engagement element enters the disengaged state and the fourth frictional engagement element enters the engaged state to implement the gear of the second gear ratio.

According to the present invention, when the prescribed condition is satisfied, at least one of the first frictional engagement element and the second frictional engagement element completely enters the disengaged state to enter the neutral state, whereby the time required for shifting is further shortened. On the other hand, when the prescribed condition on which such shifting is possible is not satisfied, the gear of the first gear ratio is shifted to the gear of the third gear ratio, and thereafter the gear of the third gear ratio is shifted to the gear of the second gear ratio. Thus, when shifting through the neutral state where at least one of the first frictional engagement element and the second frictional engagement element is completely disengaged is not desirable, shifting can be implemented not through the neutral state. This can suppress an adverse effect caused by shifting through the neutral state.

Further preferably, the predetermined condition is a condition that a change rate of an accelerator opening degree is greater than a predetermined change rate.

According to the present invention, when the condition that a change rate of an accelerator opening degree is greater than a predetermined change rate, one of the first frictional engagement element and the second frictional engagement element is completely disengaged to enter the neutral state to thereby further shorten the time required for shifting. On the other hand, when a change rate of an accelerator opening degree is smaller than a predetermined change rate, before an ECU determines shifting to the gear of the second gear ratio, it may determine shifting from the gear of the first gear ratio to the gear of the third gear ratio, and thereafter determine shifting from the gear of the third gear ratio to the gear of the second gear ratio. Here, if shifting to the gear of the third gear ratio is changed to shifting to the gear of the second gear ratio, multiple shifting that is complicated to control must be implemented, and smooth shifting control can hardly be achieved. In such a case, shifting from the gear of the first gear ratio to the gear of the third gear ratio is implemented, and thereafter shifting from the gear of the third gear ratio to the gear of the second gear ratio is implemented. Thus, the multiple shifting that is complicated to control is avoided to achieve smooth shifting.

Further preferably, each of the frictional engagement elements is actuated by a pressure of oil supplied to the automatic transmission. The predetermined condition is a condition that a temperature of the oil is higher than a predetermined temperature.

According to the present invention, when the condition that a temperature of the oil supplied to the automatic transmission for actuating each of the frictional engagement elements is higher than a predetermined temperature is satisfied, one of the first frictional engagement element and the second frictional engagement element is completely disengaged to enter the neutral state to thereby further shorten the time required for shifting. On the other hand, when the temperature of the oil is lower than a predetermined temperature, responsiveness of frictional engagement elements is low since the viscosity of oil is high. In such a case, if the automatic transmission is set to the neutral state during shifting, engagement of the third frictional engagement element and the fourth frictional engagement element may be retarded, whereby an input shaft revolution number of the automatic transmission (revolution number of the motive power source) increases more than necessary. Therefore, when the condition that a temperature of the oil is higher than a predetermined temperature is not satisfied, shifting from the gear of the first gear ratio to the gear of the third gear ratio is implemented, and thereafter shifting from the gear of the third gear ratio to the gear of the second gear ratio is implemented. Thus, shifting can be achieved without the automatic transmission entering the neutral state. This can retard engagement of the third frictional engagement element and the fourth frictional engagement element, whereby the input shaft revolution number of the automatic transmission can be suppressed from increasing more than necessary. Accordingly, shock in engagement of the third frictional engagement element and the fourth frictional engagement element can be suppressed.

Further preferably, the automatic transmission is coupled to an internal combustion engine. The predetermined condition is a condition that a temperature of a coolant of the internal combustion engine is higher than a predetermined temperature.

According to the present invention, when the condition that a temperature of a coolant of the internal combustion engine is higher than a predetermined temperature is satisfied, one of the first frictional engagement element and the second frictional engagement element is completely disengaged to enter the neutral state to thereby further shorten the time required for shifting. On the other hand, when the temperature of a coolant of the internal combustion engine is lower than a predetermined temperature, warm-up of the internal combustion engine or the catalyst may not yet be completed. In such a case, warm-up control of the internal combustion engine or the catalyst may be performed by retarding the ignition timing in the internal combustion engine. In such a state, if the engine speed is sharply increased by setting the automatic transmission to the neutral state during shifting, control of retarding the ignition timing may hardly be executed in high precision as the engine speed is hardly stabilized. Accordingly, when the condition that the temperature of a coolant of the internal combustion engine is higher than a predetermined temperature is not satisfied, shifting from the gear of the first gear ratio to the gear of the third gear ratio is implemented, and thereafter shifting from the gear of the third gear ratio to the gear of the second gear ratio is implemented. Thus, shifting can be implemented without the automatic transmission entering the neutral state. Accordingly, deterioration in the precision of the ignition timing can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 represents an operation table of a transmission.

DESCRIPTION OF THE PREFERRED EMBODIMENTS

Figure 1:
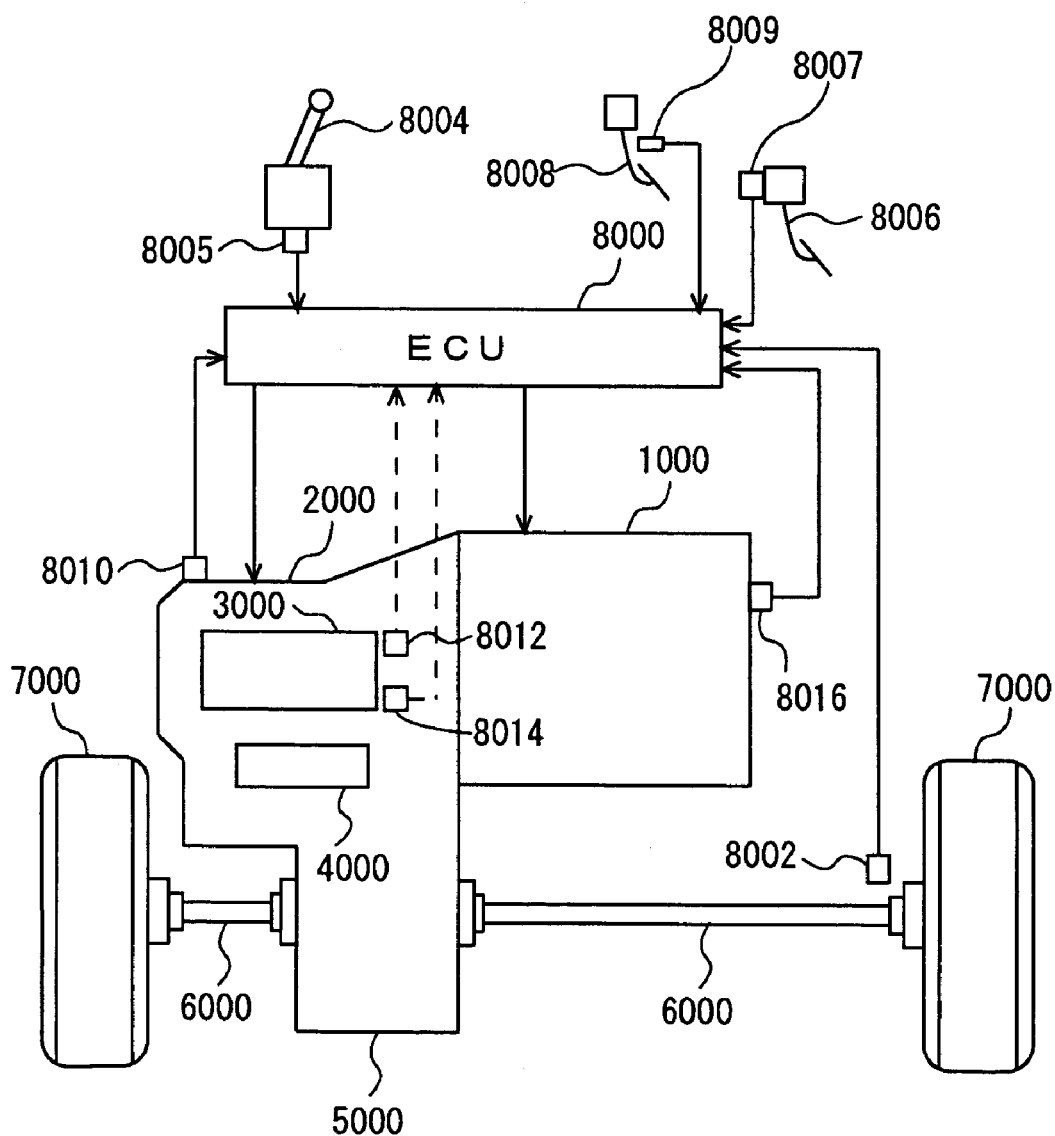
FIG. 1 is a schematic view of a powertrain under control of an ECU qualified as a control apparatus according to an embodiment of the present invention.

An embodiment of the present invention will be described hereinafter with reference to the drawings. In the following description, the same elements have the same reference characters allotted. Their designation and function are also identical. Therefore, detailed description thereof will not be repeated.

A vehicle incorporating a control apparatus according to an embodiment of the present invention will be described with reference to FIG. 1. The vehicle is an FF (Front engine Front drive) vehicle. The vehicle incorporating the control apparatus for an automatic transmission according to the present embodiment is not limited to the FF vehicle.

The vehicle includes an engine 1000, a transmission 2000, a planetary gear unit 3000 constituting a portion of transmission 2000, an oil hydraulic circuit 4000 constituting a portion of transmission 2000, a differential gear 5000, a drive shaft 6000, a front wheel 7000, and an ECU 8000.

Engine 1000 is an internal combustion engine that burns a mixture consisting of fuel injected from an injector (not shown) and air, inside a combustion chamber of a cylinder. A piston in the cylinder is pushed down by the combustion, whereby a crankshaft is rotated. An external combustion engine may be employed instead of an internal combustion engine. Further, engine 1000 may be substituted with a rotating electric machine.

Transmission 2000 converts the revolution speed of the crankshaft to a desired revolution speed by implementing a desired gear. The output gear of transmission 2000 meshes with differential gear 5000.

A driveshaft 6000 is coupled to differential gear 5000 by spline-fitting for example. Motive power is transmitted to the left and right front wheels 7000 via driveshaft 6000.

A vehicle speed sensor 8002, a position switch 8005 of a shift lever 8004, an accelerator pedal position sensor 8007 of an accelerator pedal 8006, a stop lamp switch 8009 provided at a brake pedal 8008, an oil temperature sensor 8010, an input shaft speed sensor 8012, an output shaft speed sensor 8014, and a coolant temperature sensor 8016 are connected to ECU 8000 via a harness and the like.

Vehicle speed sensor 8002 senses the vehicle speed from the revolution number of drive shaft 6000, and transmits a signal representing the sensed result to ECU 8000. The position of shift lever 8004 is sensed by position switch 8005, and a signal representing the sensed result is transmitted to ECU 8000. A gear of transmission 2000 is automatically implemented corresponding to the position of shift lever 8004. Additionally, the driver may operate to select a manual shift mode in which the driver can select a gear arbitrarily.

Accelerator pedal position sensor 8007 detects the position of accelerator pedal 8006, and transmits a signal representing the detected result to ECU 8000. Stop lamp switch 8009 senses the ON/OFF state of brake pedal 8008, and transmits a signal representing the sensed result to ECU 8000. A stroke sensor sensing the stroke level of brake pedal 8008 may be provided instead of or in addition to stop lamp switch 8009.

Oil temperature sensor 8010 senses the temperature of the ATF (Automatic Transmission Fluid) of transmission 2000, and transmits a signal representing the sensed result to ECU 8000.

Input shaft speed sensor 8012 senses the input shaft revolution number NI of transmission 2000, and transmits a signal representing the sensed result to ECU 8000. Output shaft speed sensor 8014 senses the output shaft revolution number NO of transmission 2000, and transmits a signal representing the sensed result to ECU 8000. Coolant temperature sensor 8016 senses the temperature of the coolant of engine 1000, and transmits a signal representing the sensed result to ECU 8000.

ECU 8000 controls various devices such that the vehicle attains a desired traveling state based on signals transmitted from vehicle speed sensor 8002, position switch 8005, accelerator pedal position sensor 8007, stop lamp switch 8009, oil temperature sensor 8010, input shaft speed sensor 8012, output shaft speed sensor 8014, and the like, as well as map and program stored in a ROM (Read Only Memory).

Figure 2:
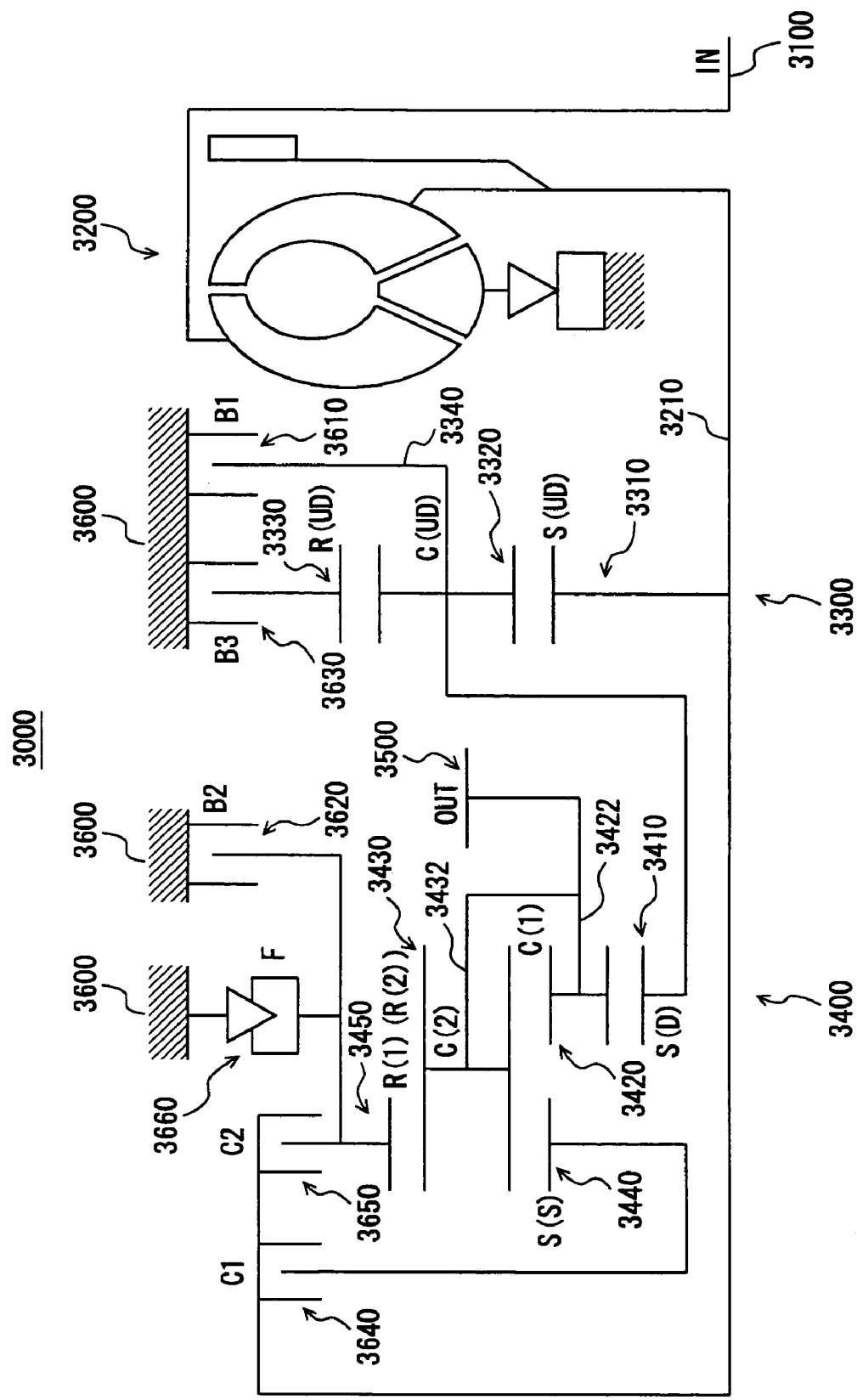
FIG. 2 is a skeletal view of a geartrain in a transmission.

Planetary gear unit 3000 will be described with reference to FIG. 2. Planetary gear unit 3000 is connected to a torque converter 3200 having an input shaft 3100 coupled to the crankshaft. Planetary gear unit 3000 includes a first set of the planetary gear mechanism 3300, a second set of the planetary gear mechanism 3400, an output gear 3500, B1, B2, and B3 brakes 3610, 3620 and 3630 fixed to a gear case 3600, C1 and C2 clutches 3640 and 3650, and a one-way clutch F 3660.

First set 3300 is a single pinion type planetary gear mechanism. First set 3300 includes a sun gear S (UD) 3310, a pinion gear 3320, a ring gear R (UD) 3330, and a carrier C (UD) 3340.

Sun gear S (UD) 3310 is coupled to an output shaft 3210 of torque converter 3200. Pinion gear 3320 is rotatably supported on carrier C (UD) 3340. Pinion gear 3320 engages with sun gear S (UD) 3310 and ring gear R (UD) 3300.

Ring gear R (UD) 3330 is fixed to gear case 3600 by B3 brake 3630. Carrier C (UD) 3340 is fixed to gear case 3600 by B1 brake 3610.

Second set 3400 is a Ravigneaux type planetary gear mechanism. Second set 3400 includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

Sun gear S (D) 3410 is coupled to carrier C (UD) 3340. Short pinion gear 3420 is rotatably supported on carrier C (1) 3422. Short pinion gear 3420 engages with sun gear S (D) 3410 and long pinion gear 3430. Carrier C (1) 3422 is coupled with output gear 3500.

Long pinion gear 3430 is rotatably supported on carrier C (2) 3432. Long pinion gear 3430 engages with short pinion gear 3420, sun gear S (S) 3440, and ring gear R (1) (R (2)) 3450. Carrier C (2) 3432 is coupled with output gear 3500.

Sun gear S (S) 3440 is coupled to output shaft 3210 of torque converter 3200 by C1 clutch 3640. Ring gear R (1) (R (2)) 3450 is fixed to gear case 3600 by B2 brake 3620, and coupled to output shaft 3210 of torque converter 3200 by C2 clutch 3650. Ring gear R (1) (R (2)) 3450 is coupled to one-way clutch F 3660, and is disabled in rotation during the drive in first gear.

One-way clutch F 3660 is provided in parallel with B2 brake 3620. Specifically, one-way clutch F 3660 has the outer race fixed to gear case 3600, and the inner race coupled to ring gear R (1) (R (2)) 3450 via the rotation shaft.

FIG. 3 is an operation table representing the relation between gears to be shifted and operation states of the clutches and brakes. By operating each brake and each clutch based on the combination shown in the operation table, the forward gears including first gear to sixth gear and the reverse gear are implemented.

Since one-way clutch F 3660 is provided in parallel with B2 brake 3620, it is not necessary to engage B2 brake 3620 in a driving state from the engine side (acceleration) during implementation of first gear (1ST), as indicated in the operation table.

During the drive in first gear, one-way clutch F 3660 restrains the rotation of ring gear R (1) (R (2)) 3450. When engine brake is effected, one-way clutch F 3660 does not restrain the rotation of ring gear R (1) (R (2)) 3450.

Specifically, during the drive, first gear is implemented by engagement of C1 clutch 3640 and one-way clutch F 3660. During engine braking, first gear is implemented by engagement of C1 clutch 3640 and B2 brake 3620.

As shown in FIG. 3, a gear is implemented by engagement of any two of the six frictional engagement elements and disengagement of the others. When shifting from sixth gear to third gear or from fifth gear to second gear, both of the two engaged frictional engagement elements must be changed.

On the other hand, when shifting from sixth gear to fifth or fourth gear; from fifth gear to fourth or third gear; from fourth gear to third or second gear; or from third gear to second gear, it is only necessary to change one of the two engaged frictional engagement elements.

Figure 4:
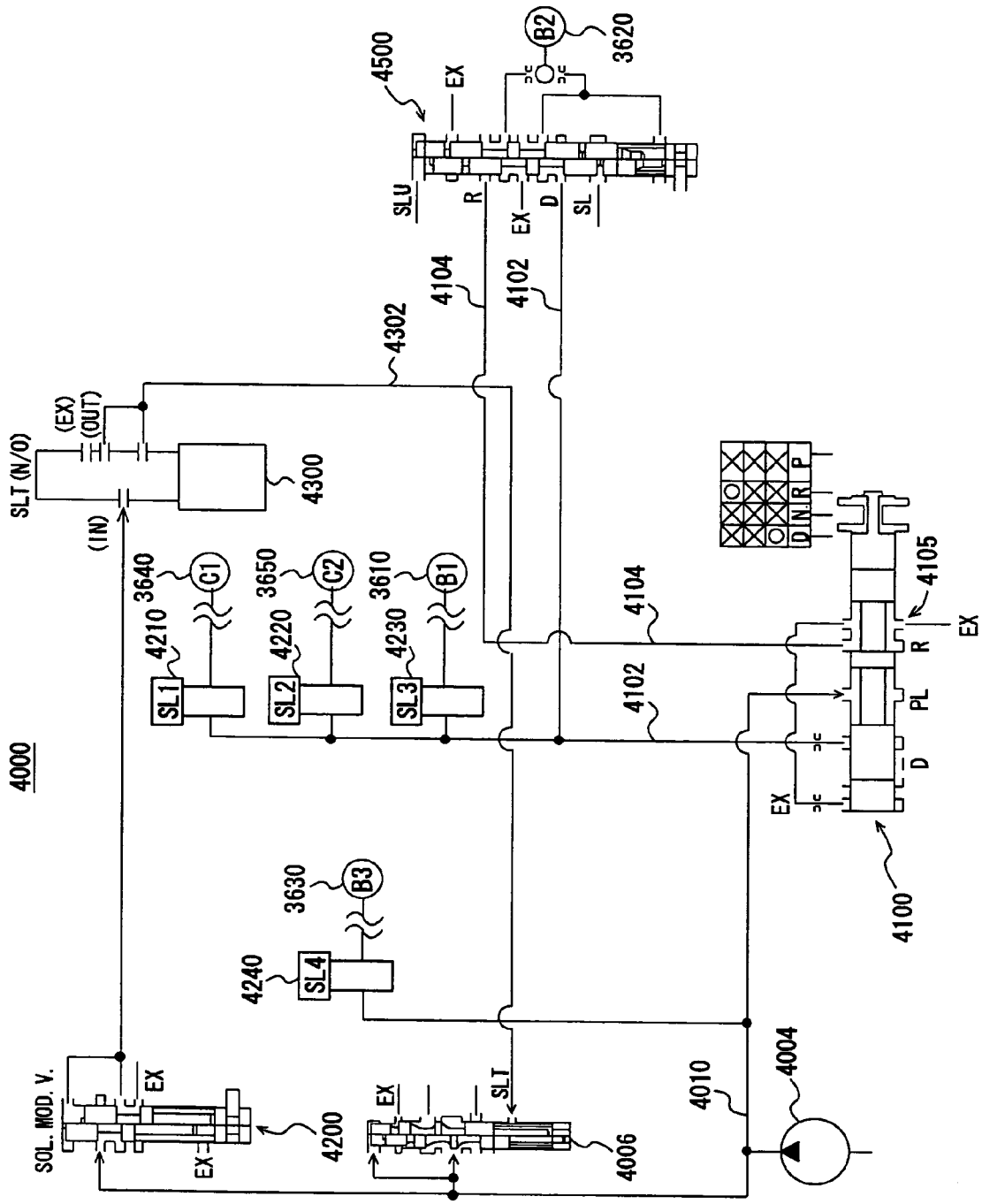
FIG. 4 shows a portion of an oil hydraulic circuit in the transmission.

Oil hydraulic circuit 4000 will be described hereinafter with reference to FIG. 4. FIG. 4 represents only the portion of oil hydraulic circuit 4000 related to the present invention. Oil hydraulic circuit 4000 includes an oil pump 4004, a primary regulator valve 4006, a manual valve 4100, a solenoid modulator valve 4200, an SL1 linear solenoid (hereinafter, indicated as SL (1)) 4210, an SL2 linear solenoid (hereinafter, indicated as SL (2)) 4220, an SL3 linear solenoid (hereinafter, indicated as SL (3)) 4230, an SL4 linear solenoid (hereinafter, indicated as SL (4)) 4240, an SLT linear solenoid (hereinafter, indicated as SLT) 4300, and a B2 control valve 4500.

Oil pump 4004 is coupled with the crankshaft of engine 1000. By rotation of the crankshaft, oil pump 4004 is driven to generate oil pressure. The oil pressure generated at oil pump 4004 is adjusted by primary regulator valve 4006, whereby line pressure is generated.

Primary regulator valve 4006 operates with the throttle pressure adjusted by SLT 4300 as the pilot pressure. The line pressure is supplied to manual valve 4100 via a line pressure oil channel 4010. The line pressure is adjusted by SL (4) 4240 to be supplied to B3 brake 3630.

Manual valve 4100 includes a drain port 4105. The oil pressure of a D range pressure oil channel 4102 and an R range pressure oil channel 4104 is discharged from drain port 4105. When the spool of manual valve 4100 is at the D position, line pressure oil channel 4010 communicates with D range pressure oil channel 4102, whereby oil pressure is supplied to D range pressure oil channel 4102. At this stage, R range pressure oil channel 4104 communicates with drain port 4105, whereby the R range pressure of R range pressure oil channel 4104 is discharged from drain port 4105.

When the spool of manual valve 4100 is at the R position, line pressure oil channel 4010 communicates with R range pressure oil channel 4104, whereby oil pressure is supplied to R range pressure oil channel 4104. At this stage, D range pressure oil channel 4102 communicates with drain port 4105, whereby the D range pressure of D range pressure oil channel 4102 is discharged from drain port 4105.

When the spool of manual valve 4100 is at the N position, D range pressure oil channel 4102 and R range pressure oil channel 4104 both communicate with drain port 4105, whereby the D range pressure of D range pressure oil channel 4102 and the R range pressure of R range pressure oil channel 4104 are discharged from drain port 4105.

The oil pressure supplied to D range pressure oil channel 4102 is eventually supplied to B1 brake 3610, B2 brake 3620, C1 clutch 3640 and C2 clutch 3650.

The oil pressure supplied to R range pressure oil channel 4104 is eventually supplied to B2 brake 3620.

Solenoid modulator valve 4200 adjusts the line pressure at a constant level. The oil pressure adjusted by solenoid modulator valve 4200 (solenoid modulator pressure) is supplied to SLT 4300.

SL (1) 4210 adjusts the oil pressure supplied to C1 clutch 3640. SL (2) 4220 adjusts the oil pressure supplied to C2 clutch 3650. SL (3) 4230 adjusts the oil pressure supplied to B1 brake 3610.

SLT 4300 responds to a control signal from ECU 8000 based on the accelerator pedal position detected by accelerator pedal position sensor 8007 to adjust the solenoid modulator pressure and generate the throttle pressure. The throttle pressure is supplied to primary regulator valve 4006 via SLT oil channel 4302. The throttle pressure is used as the pilot pressure of primary regulator valve 4006.

SL (1) 4210, SL (2) 4220, SL (3) 4230 and SLT 4300 are controlled by a control signal transmitted from ECU 8000.

B2 control valve 4500 selectively supplies the oil pressure from one of D range pressure oil channel 4102 and R range pressure oil channel 4104 to B2 brake 3620. D range oil pressure 4102 and R range oil pressure 4104 are connected to B2 control valve 4500. B2 control valve 4500 is controlled by the oil pressure supplied from an SL solenoid valve (not shown) and an SLU solenoid valve (not shown) and the urge of the spring.

When the SL solenoid valve is OFF and SLU solenoid valve is ON, B2 control valve 4500 attains the left side state of FIG. 4. In this case, B2 brake 3620 is supplied with oil pressure having the D range pressure adjusted with the oil pressure supplied from the SLU solenoid valve as the pilot pressure.

When the SL solenoid valve is ON and the SLU solenoid valve is OFF, B2 control valve 4500 attains the right side state of FIG. 4. In this case, B2 brake 3620 is supplied with the R range pressure.

Figure 5:
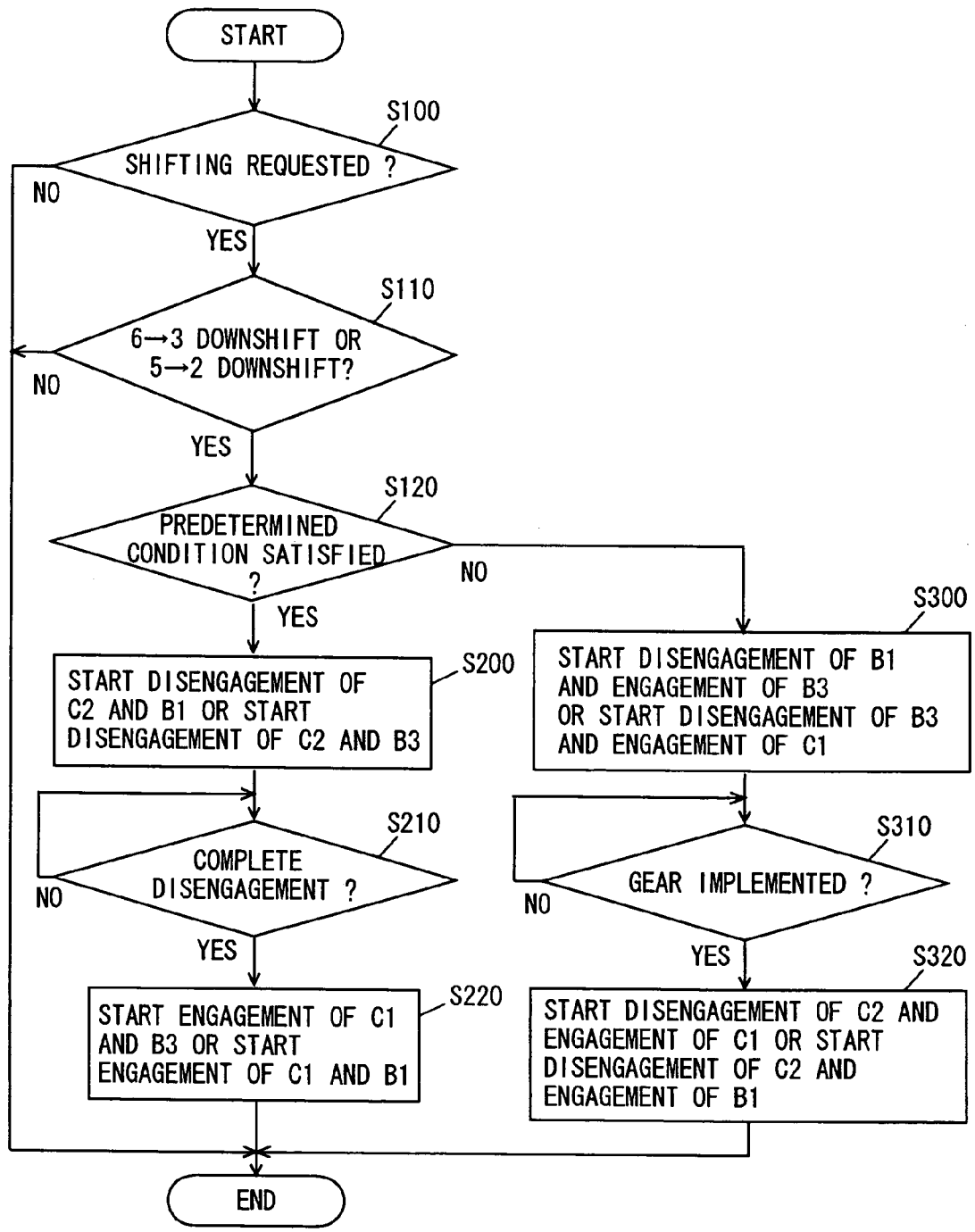
FIG. 5 is a flowchart showing a control structure of a program executed by the ECU qualified as the control apparatus according to the first embodiment of the present invention.

Referring to FIG. 5, a description will be given of a control structure of a program executed by ECU 8000 qualified as the control apparatus according to the present embodiment.

In step (step is hereinafter abbreviated as S) 100, ECU 8000 determines whether or not shifting is requested. Whether or not shifting is requested is determined based on the shifting diagram having the vehicle speed and the accelerator pedal position as parameters, and the driver's operation of shift lever 8004. When shifting is requested (YES in S100), the program proceeds to S110. Otherwise (NO in S100), the program is ended.

In S110, ECU 8000 determines whether or not downshifting from sixth gear to third gear, or from fifth gear to second gear is requested. That is, ECU 8000 determines whether or not two engaged frictional engagement elements before shifting are both different from those after shifting.

When downshifting from sixth gear to third gear, or from fifth gear to second gear is requested (YES in S110), the program proceeds to S120. Otherwise (NO in S110), the program is ended.

In S120, ECU 8000 determines whether or not predetermined conditions are satisfied. The predetermined conditions include a condition that the change rate of the degree by which the accelerator pedal is depressed, or the accelerator opening degree, is greater than a predetermined change rate, a condition that the temperature of the ATF is higher than a predetermined temperature, a condition that the temperature of the coolant of engine 1000 is higher than a predetermined temperature. When the predetermined conditions are satisfied (YES in S120), the program proceeds to S200. Otherwise (NO in S120), the program proceeds to S300.

In S200, ECU 8000 starts disengagement of C2 clutch 3650 and B1 brake 3610 when downshifting from sixth gear to third gear, or disengagement of C2 clutch 3650 and B3 brake 3630 when downshifting from fifth gear to second gear.

In S210, ECU 8000 determines whether or not at least one of C2 clutch 3650 and B1 brake 3610 is completely disengaged when downshifting from sixth gear to third gear, or whether or not at least one of C2 clutch 3650 and B3 brake 3630 is completely disengaged when downshifting from fifth gear to second gear. Here, complete disengagement of the clutches and brakes means that they are not engaging or slipping. Whether or not the clutches and brakes is completely disengaged is determined based on the difference between input shaft revolution number NI and output revolution number NO, the increase rate of input shaft revolution number NI and the like.

When at least one of C2 clutch 3650 and B1 brake 3610, or at least one of C2 clutch 3650 and B3 brake 3630, is completely disengaged (YES in S210), the program proceeds to S220. Otherwise (NO in S210), the program goes back to S210.

In S220, ECU 8000 starts engagement of C1 clutch 3640 and B3 brake 3630 when downshifting from sixth gear to third gear, or engagement of C1 clutch 3640 and B1 brake 3610 when downshifting from fifth gear to second gear. It is noted that the engagement of the two frictional engagement elements may be started at the same or different timing. Thereafter, the program is ended.

In S300, ECU 8000 starts disengagement of B1 brake 3610 and engagement of B3 brake 3630 when the gear before shifting is sixth gear, or starts disengagement of B3 brake 3630 and engagement of C1 clutch 3640 when the gear before shifting is fifth gear. It is noted that the engagement and disengagement may be started at the same or different timing.

In S310, ECU 8000 determines whether or not fifth gear is implemented when the gear before shifting is sixth gear, or whether or not fourth gear is implemented when the gear before shifting is fifth gear. That is, whether or not downshifting from sixth gear to fifth gear or downshifting from fifth gear to fourth gear is completed is determined. Whether or not fifth gear or fourth gear is implemented is determined based on the difference between input shaft revolution number NI and output revolution number NO, for example.

When fifth gear or fourth gear is implemented (YES in S310), the program proceeds to S320. Otherwise (NO in S310), the program proceeds to S310.

In S320, ECU 8000 starts disengagement of C2 clutch 3650 and engagement of C1 clutch 3640 when fifth gear is implemented, or disengagement of C2 clutch 3650 and engagement of B1 brake 3610 when fourth gear is implemented. The disengagement and engagement may be started at the same or different timing. Thereafter, the program is ended.

A description will now be given of an operation of ECU 8000 qualified as the control apparatus according to the present embodiment based on the above-described structure and flowchart.

When the accelerator opening degree becomes greater as the driver further presses down accelerator pedal 8006 while driving the vehicle, the accelerator opening degree exceeds the shifting line, whereby it is determined that shifting is requested (YES in S100). Here, it is assumed that downshifting from sixth gear to third gear is requested (YES in S110).

When the condition that the change rate of the accelerator opening degree is greater than a predetermined change rate, the condition that the temperature of the ATF is higher than a predetermined temperature, and the condition that the temperature of the coolant of engine 1000 is higher than a predetermined temperature are all satisfied (YES in S120), shifting is implemented directly from sixth gear to third gear.

In order to implement shifting directly from sixth gear to third gear, disengagement of C2 clutch 3650 and B1 brake 3610 engaged in sixth gear are started (S200). When at least one of C2 clutch 3650 and B1 brake 3610 is completely disengaged (YES in S210), engagement of C1 clutch 3640 and B3 brake 3630 is started (S220), and ultimately third gear is implemented.

Thus, from the state where sixth gear is implemented, by once setting transmission 2000 in the neutral state and increasing input shaft revolution number NI (engine speed NE), downshifting to third gear can be achieved.

Here, at least one of C2 clutch 3650 and B1 brake 3610 is completely disengaged, and therefore an increase in input shaft revolution number NI is not suppressed. Thus, input shaft revolution number NI can quickly be increased.

Therefore, input shaft revolution number NI can quickly be synchronized with the synchronous revolution number of third gear. As a result, the time required for downshifting (the time required for synchronization of the revolution number) can be shortened. It holds true for downshifting from fifth gear to second gear.

On the other hand, when the change rate of the accelerator opening degree is smaller than the predetermined change rate (NO in S120), after it is determined that there is a request for downshifting to fifth gear, it may be determined that there is a request for downshifting to third gear. In this case, if downshift from sixth gear to fifth gear is changed to downshift from sixth gear to third gear, multiple shifting that is difficult to control must be implemented, and smooth shifting control can hardly be achieved.

If the temperature of the ATF is lower than a predetermined temperature (NO in S120), responsiveness of the clutches and brakes is low since viscosity of the ATF is high. Therefore, if transmission 2000 is set to the neutral state during shifting, engagement of C1 clutch 3640 and B3 brake 3630 may be retarded. When engagement of C1 clutch 3640 and B3 brake 3630 is retarded, input shaft revolution number NI (engine speed NE) increases more than necessary, and shock may occur when C1 clutch 3640 and B3 brake 3630 are engaged.

When the temperature of the coolant of engine 1000 is lower than a predetermined temperature (NO in S120), it may be possible that the ignition timing is retarded for warm-up of engine 1000 or catalyst (not shown). In a state where the ignition timing is retarded, if engine speed NE is sharply increased by setting transmission 2000 to the neutral state, control of retarding the ignition timing may hardly be executed as the engine speed is hardly stabilized.

In such states, it is not appropriate to shift through the neutral state. Accordingly, when one of the condition that the change rate of the accelerator pedal position is greater than a predetermined change rate, the condition that the temperature of the ATF is higher than a predetermined temperature, and the condition that the temperature of coolant of engine 1000 is higher than a predetermined temperature is not satisfied (NO in S120), downshifting from sixth gear through fifth gear to third gear is implemented.

As sixth gear is once shifted to fifth gear, disengagement of B1 brake 3610 engaged in sixth gear is started, and engagement of B3 brake 3630 engaged in fifth gear and third gear is started (S300).

When fifth gear is implemented (when downshifting to fifth gear is completed) (YES in S310), disengagement of C2 clutch 3650 engaged in sixth gear and fifth gear is started, and engagement of C1 clutch 3640 engaged in third gear is started. Ultimately, third gear is implemented.

Thus, without setting transmission 2000 to the neutral state, downshifting from sixth gear to third gear can be implemented. Thus, any adverse effect invited by the neutral state can be suppressed. It holds true for downshifting from fifth gear through fourth gear to second gear.

As above, after at least one of the two frictional engagement elements engaged in the gear before shifting is completely disengaged, the ECU qualified as the control apparatus according to the present embodiment starts engagement of two frictional engagement elements to be engaged in the gear after shifting. Thus, when downshifting from sixth gear to third gear, or from fifth gear to second gear, it can be implemented through the neutral state. Therefore, in the neutral state, input shaft revolution number NI of the transmission (engine speed NE) can quickly be increased to the synchronous revolution number after shifting. As a result, the time required for downshifting can be shortened.

If the predetermined conditions are not satisfied (NO in S120), instead of downshifting from sixth gear through fifth gear to third gear, it is possible to downshift from sixth gear through fourth gear to third gear. Similarly, instead of downshifting from fifth gear through fourth gear to second gear, it is possible to downshift from fifth gear through third gear to second gear.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an automatic transmission in which a first gear ratio is implemented when a first frictional engagement element and a second frictional engagement element are in an engaged state and a third frictional engagement element and a fourth frictional engagement element are in a disengaged state, and a second gear ratio is implemented when said first frictional engagement element and said second frictional engagement element are in the disengaged state and said third frictional engagement element and said fourth frictional engagement element are in the engaged state, said control apparatus for the automatic transmission comprising:

an operation unit, wherein said operation unit controls said first frictional engagement element and said second frictional engagement element so that, from a state where said first gear ratio is implemented, said first frictional engagement element and said second frictional engagement element start to enter the disengaged state, and wherein said operation unit controls said third frictional engagement element and said fourth frictional engagement element so that, after at least one of said first frictional engagement element and said second frictional engagement element completely enters the disengaged state, engagement of said third frictional engagement element and said fourth frictional engagement element is started to implement said second gear ratio.

2. The control apparatus for the automatic transmission according to claim 1, wherein a third gear ratio is implemented when said second frictional engagement element and said third frictional engagement element are in the engaged state and said first frictional engagement element and said fourth frictional engagement element are in the disengaged state, wherein when a predetermined condition is satisfied, said operation unit controls said first frictional engagement element and said second frictional engagement element so that, from the state where said first gear ratio is implemented, said first frictional engagement element and said second frictional engagement element start to enter the disengaged state, wherein when said predetermined condition is satisfied, said operation unit controls said third frictional engagement element and said fourth frictional engagement element so that, after at least one of said first frictional engagement element and said second frictional engagement element completely enters the disengaged state, engagement of said third frictional engagement element and said fourth frictional engagement element is started, and wherein when said predetermined condition is not satisfied, said operation unit controls each of said frictional engagement elements so that, after said first frictional engagement element enters the disengaged state and said third frictional engagement element enters the engaged state to implement said third gear ratio, said second frictional engagement element enters the disengaged state and said fourth frictional engagement element enters the engaged state to implement said second gear ratio.

3. The control apparatus for the automatic transmission according to claim 2, wherein said predetermined condition is a condition that a change rate of an accelerator opening degree is greater than a predetermined change rate.

4. The control apparatus for the automatic transmission according to claim 2, wherein each of said frictional engagement elements is actuated by a pressure of oil supplied to said automatic transmission, and wherein said predetermined condition is a condition that a temperature of said oil is higher than a predetermined temperature.

5. The control apparatus for the automatic transmission according to claim 2, wherein said automatic transmission is coupled to an internal combustion engine, and wherein said predetermined condition is a condition that a temperature of a coolant of said internal combustion engine is higher than a predetermined temperature.

6. A control method for an automatic transmission in which a first gear ratio is implemented when a first frictional engagement element and a second frictional engagement element are in an engaged state and a third frictional engagement element and a fourth frictional engagement element are in a disengaged state, and a second gear ratio is implemented when said first frictional engagement element and said second frictional engagement element are in the disengaged state and said third frictional engagement element and said fourth frictional engagement element are in the engaged state, said control method for an automatic transmission comprising the steps of:

controlling said first frictional engagement element and said second frictional engagement element so that, from a state where said first gear ratio is implemented, said first frictional engagement element and said second frictional engagement element start to enter the disengaged state, and controlling said third frictional engagement element and said fourth frictional engagement element so that, after at least one of said first frictional engagement element and said second frictional engagement element completely enters the disengaged state, engagement of said third frictional engagement element and said fourth frictional engagement element is started to implement said second gear ratio.

7. The control method for the automatic transmission according to claim 6, wherein a third gear ratio is implemented when said second frictional engagement element and said third frictional engagement element are in the engaged state and said first frictional engagement element and said fourth frictional engagement element are in the disengaged state, wherein when a predetermined condition is satisfied, controlling said first frictional engagement element and said second frictional engagement element so that, from the state where said first gear ratio is implemented, said first frictional engagement element and said second frictional engagement element enter the disengaged state, wherein when said predetermined condition is satisfied, controlling said third frictional engagement element and said fourth frictional engagement element so that, after at least one of said first frictional engagement element and said second frictional engagement element completely enters the disengaged state, engagement of said third frictional engagement element and said fourth frictional engagement element is started, and wherein when said predetermined condition is not satisfied, controlling each of said frictional engagement elements so that, after said first frictional engagement element enters the disengaged state and said third frictional engagement element enters the engaged state to implement said third gear ratio, said second frictional engagement element enters the disengaged state and said fourth frictional engagement element enters the engaged state to implement said second gear ratio.

8. The control method for the automatic transmission according to claim 7, wherein said predetermined condition is a condition that a change rate of an accelerator opening degree is greater than a predetermined change rate.

9. The control method for the automatic transmission according to claim 7,
wherein each of said frictional engagement elements is actuated by a pressure of oil supplied to said automatic transmission, and
wherein said predetermined condition is a condition that a temperature of said oil is higher than a predetermined temperature.

10. The control method for the automatic transmission according to claim 7,
wherein said automatic transmission is coupled to an internal combustion engine, and
wherein said predetermined condition is a condition that a temperature of a coolant of said internal combustion engine is higher than a predetermined temperature.

11. A control apparatus for an automatic transmission in which a first gear ratio is implemented when a first frictional engagement element and a second frictional engagement element are in an engaged state and a third frictional engagement element and a fourth frictional engagement element are in a disengaged state, and a second gear ratio is implemented when said first frictional engagement element and said second frictional engagement element are in the disengaged state and said third frictional engagement element and said fourth frictional engagement element are in the engaged state, said control apparatus for an automatic transmission comprising:
first control means for controlling said first frictional engagement element and said second frictional engagement element so that, from a state where said first gear ratio is implemented, said first frictional engagement element and said second frictional engagement element start to enter the disengaged state, and
second control means for controlling said third frictional engagement element and said fourth frictional engagement element so that, after at least one of said first frictional engagement element and said second frictional engagement element completely enters the disengaged state, engagement of said third frictional engagement element and said fourth frictional engagement element is started to implement said second gear ratio.

12. The control apparatus for the automatic transmission according to claim 11,
wherein a third gear ratio is implemented when said second frictional engagement element and said third frictional engagement element are in the engaged state and said first frictional engagement element and said fourth frictional engagement element are in the disengaged state,
wherein said first control means includes means for controlling said first frictional engagement element and said second frictional engagement element so that, when a predetermined condition is satisfied, from the state where said first gear ratio is implemented, said first frictional engagement element and said second frictional engagement element start to enter the disengaged state,
wherein said second control means includes means for controlling said third frictional engagement element and said fourth frictional engagement element so that, when said predetermined condition is satisfied, after at least one of said first frictional engagement element and said second frictional engagement element completely enters the disengaged state, engagement of said third frictional engagement element and said fourth frictional engagement element is started, and
wherein said control apparatus further includes means for controlling each of said frictional engagement elements so that, when said predetermined condition is not satisfied, after said first frictional engagement element enters the disengaged state and said third frictional engagement element enters the engaged state to implement said third gear ratio, said second frictional engagement element enters the disengaged state and said fourth frictional engagement element enters the engaged state to implement said second gear ratio.

13. The control apparatus for the automatic transmission according to claim 12, wherein said predetermined condition is a condition that a change rate of an accelerator opening degree is greater than a predetermined change rate.

14. The control apparatus for the automatic transmission according to claim 12,
wherein each of said frictional engagement elements is actuated by a pressure of oil supplied to said automatic transmission, and
wherein said predetermined condition is a condition that a temperature of said oil is higher than a predetermined temperature.

15. The control apparatus for the automatic transmission according to claim 12,
wherein said automatic transmission is coupled to an internal combustion engine, and
wherein said predetermined condition is a condition that a temperature of a coolant of said internal combustion engine is higher than a predetermined temperature.

* * * * *